(12) United States Patent
Endo

(10) Patent No.: US 8,427,808 B2
(45) Date of Patent: Apr. 23, 2013

(54) VARIABLE CAPACITY ELEMENT

(75) Inventor: Mitsuyoshi Endo, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 466 days.

(21) Appl. No.: 12/714,773

(22) Filed: Mar. 1, 2010

(65) Prior Publication Data

US 2011/0007448 A1    Jan. 13, 2011

(30) Foreign Application Priority Data

Jul. 10, 2009    (JP) .................................. 2009-163583

(51) Int. Cl.
*H01G 5/00*    (2006.01)
*H01G 7/00*    (2006.01)

(52) U.S. Cl.
USPC ...................................................... 361/277

(58) Field of Classification Search .................. 361/277, 361/278, 290
See application file for complete search history.

(56) References Cited

U.S. PATENT DOCUMENTS

| | | | |
|---|---|---|---|
| 5,818,683 A * | 10/1998 | Fujii | 361/277 |
| 6,229,685 B1 * | 5/2001 | Bothra et al. | 361/306.3 |
| 6,242,989 B1 | 6/2001 | Barber et al. | |
| 6,507,475 B1 * | 1/2003 | Sun | 361/281 |
| 6,531,807 B2 * | 3/2003 | Tanaka et al. | 310/344 |
| 6,970,340 B2 * | 11/2005 | Nakayama | 361/277 |
| 7,002,787 B2 * | 2/2006 | Nakayama | 361/277 |
| 7,369,394 B2 * | 5/2008 | Kurioka | 361/277 |
| 7,742,275 B2 * | 6/2010 | Liu | 361/277 |

FOREIGN PATENT DOCUMENTS

JP    2004-327877    11/2004

* cited by examiner

*Primary Examiner* — Eric Thomas
(74) *Attorney, Agent, or Firm* — Turocy & Watson, LLP

(57) ABSTRACT

A variable capacity element has a substrate, a pair of capacitor electrodes, a pair of driver electrodes, and a pair of capacitor wirings why one of the capacitor electrodes is movable by applying a voltage between the driver electrodes. A pair of driver electrodes are connected to the pair of capacitor electrodes, being insulated from the capacitor electrodes. A pair of capacitor wiring extend in parallel each other from connecting portions with the pairs of the capacitor electrodes, being electrically connected with the capacitor electrodes.

16 Claims, 4 Drawing Sheets

VARIABLE CAPACITY ELEMENT

CROSS REFERENCE TO RELATED APPLICATION

This application is based upon and claims the benefit of priority from the prior Japanese Patent Application No. 2009-163583, filed on Jul. 10, 2009, the entire contents of which are incorporated herein by reference.

BACKGROUND

Mobile phone systems have a variety of frequency ranges from 70 MHz to 5 GHz. In order to process these multiple frequency ranges, one terminal device in a conventional system is required to have RF (Radio Frequency) circuits. Each RF circuit transmits and receives signals in a different frequency range, respectively.

For downsizing and reducing the thickness of the terminal device, an area of hardware is required to be reduced as small as possible. However, it is problem that the area of the circuits becomes extremely large because RF circuits for multiple frequency ranges must be provided in above method. Therefore it is tried to simplify the system by commonly using a variable capacity element as matching element, formed with MEMS (Micro Electro Mechanical System) technology.

Japanese Patent Application Publication (Kokai) No. 2004-32788 discloses such variable capacity element that has a pair of capacitor electrodes having square shape with parallel plates, and drive electrodes connected with one of capacitor electrodes mechanically. Electrostatic attractive force is generated by applying voltage between driver electrodes in such variable capacity element. Capacitance of the variable capacity element is formed by a pair of capacitor electrodes, and is variable with a change of a distance of electrodes, by moving one of capacitor electrodes which is connected with one of the driver electrodes mechanically. If capacitance exists in a region other than the capacitor electrodes, a ratio of variability of the variable capacity element is decreased. Therefore capacitor wirings connected with capacitor electrodes respectively, are arranged to intersect with right angles to each other to eliminate above capacitance in the region other than the capacitor electrodes.

It is required that an inductance of the capacitor should be low to prevent from decreasing its self-resonant frequency, in a case of increasing the area of the capacitor electrodes to cope with a request of increasing its capacitance. For example, to suppress the self-resonant frequency in 5 GHz, it is sufficient that the effective inductance is below 1 nH when the effective capacitance is 1 pF. Meanwhile, when the effective capacitance is increased to 10 pF, the effective inductance is required to be lowered below 100 pF. However, conventionally capacitor wirings connected with capacitor electrodes are arranged to intersect at right angles to each other, so that the inductance is large. Therefore it is difficult to attain the effective inductance is below 100 pF, considering whole variable capacity element should be molded.

Furthermore whole variable capacity element has to be sealed with a hollow sealing architecture to have mobility of the capacitor electrode. It is preferable that the sealing architecture is manufactured in a semiconductor wafer process when the variable capacity element is manufactured in the same process. Therefore it is proposed to manufacture the architecture by a thin insulated film. However, if the area of the capacitor electrode increases, the sealing architecture becomes so large. Therefore mechanical strength cannot be obtained so that it is problem that the variable capacity element breaks down.

As stated above, increasing the capacitance of the variable capacity element was difficult because reduction of inductance and holding the mechanical strength of the sealing architecture is difficult.

SUMMARY

According to an aspect of the invention, a variable capacity element is provided, which comprises a substrate, a pair of capacitor electrodes, each being planar in a rectangular shape substantially, one of capacitor electrodes being movable, a pair of driver electrodes connected to the a pair of capacitor electrodes, the driver electrodes being insulated with capacitor electrodes and a pair of capacitor wirings extending in parallel each other from connecting portions with the pairs of the capacitor electrodes, each capacitor wiring being electrically connected with each capacitor electrode.

According to another aspect of the invention, a variable capacity element is provided, which comprises a substrate, a pair of capacitor electrodes, each being planar in a rectangular shape substantially, one of capacitor electrodes being movable, a pair of driver electrodes which is connected to a pair of capacitor electrodes, the driver electrodes being insulated with capacitor electrodes and multiple pairs of capacitor wirings connected to the pair of the capacitor electrodes respectively, each capacitor wiring being electrically connected with each capacitor electrode.

According to another aspect of the invention, a variable capacity element is provided, which comprises a substrate, a pair of capacitor electrodes, each being planar in a rectangular shape substantially, one of capacitor electrodes being movable, multiple pairs of driver electrodes which is connected to a pair of capacitor electrodes, the driver electrodes being insulated with capacitor electrodes and multiple pairs of capacitor wirings extending in parallel each other from connecting portions with the pairs of the capacitor electrodes, each capacitor wiring being electrically connected with each capacitor electrode.

DETAILED DESCRIPTION

Embodiments of a present invention will be description hereinafter with reference to the accompanying drawings. It is noted that the invention is not limited to such embodiments described hereinafter. According to figures, the same part is identified by the same reference numbers or symbols.

The drawings are schematic or conceptual. The relationship between the thickness and the width of each portion, and the size ratio between the portions, for instance, are not necessarily identical to those in reality. Furthermore, the same portion may be shown with different dimensions or ratios depending on the figures.

Figure 1:
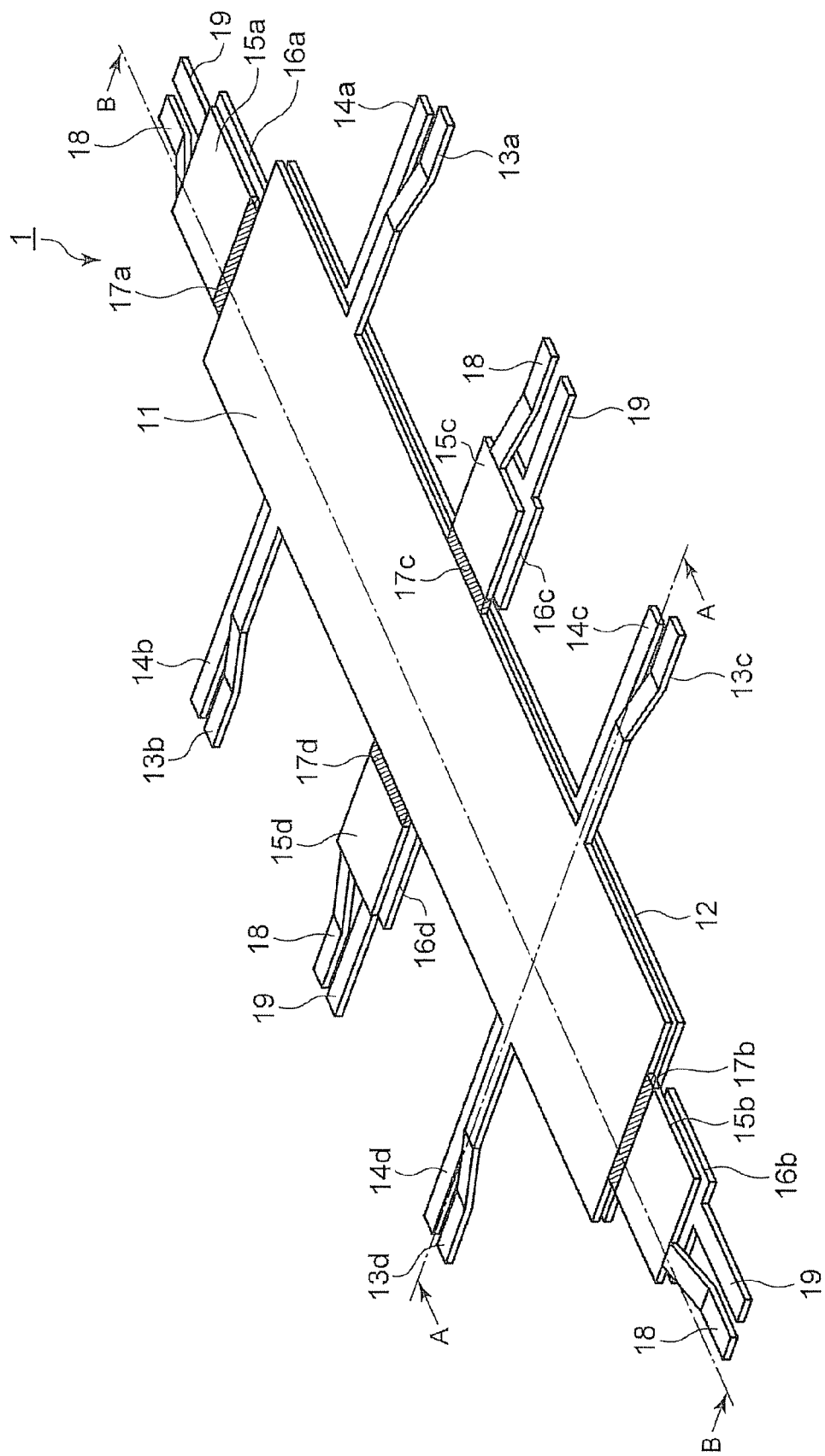
FIG. 1 is a perspective view showing a variable capacity element of a first embodiment according to the present invention.
Figure 2:
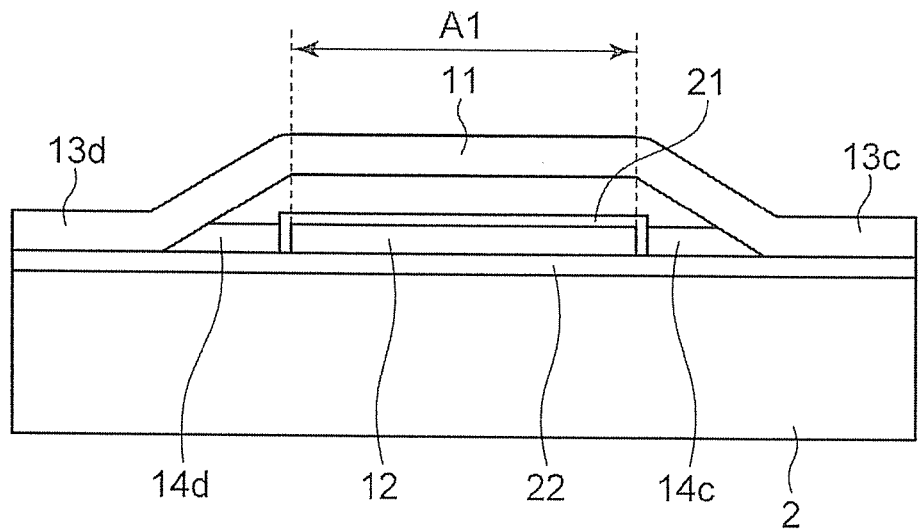
FIG. 2 is a sectional view taken along a plane A-A of FIG. 1 and seen from a direction of an arrow.
Figure 3:
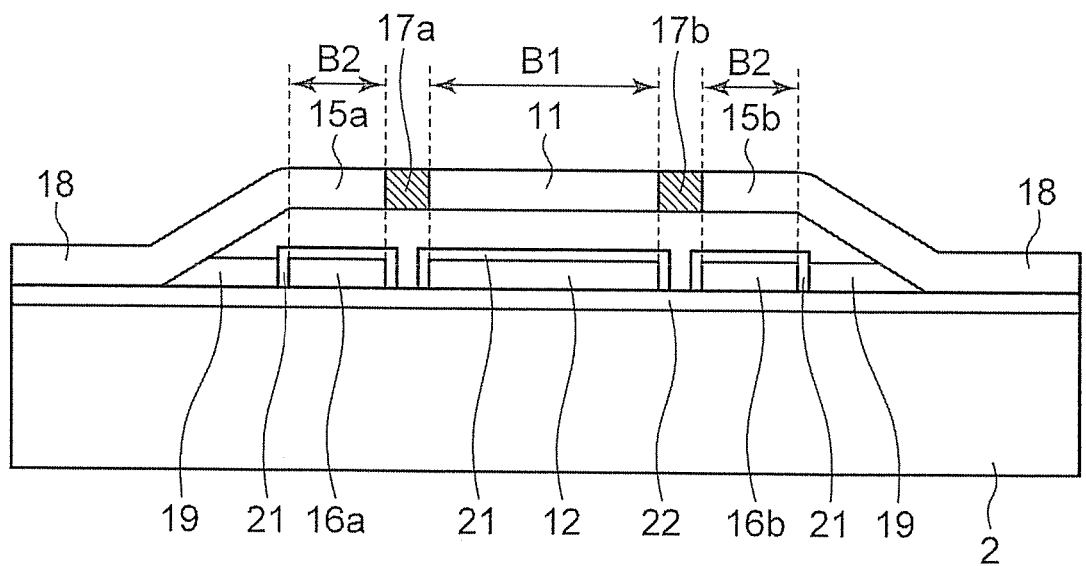
FIG. 3 is a sectional view taken along a plane B-B of FIG. 1 and seen from a direction of an arrow.

A first embodiment is explained. FIG. 1 is a perspective view showing a variable capacity element of a first embodiment according to the present invention. FIG. 2 is a sectional view taken along a plane A-A of FIG. 1 and seen from a direction of an arrow. FIG. 3 is a sectional view taken along a plane B-B of FIG. 1 and seen from a direction of an arrow.

As shown in FIG. 1, a variable capacity element 1 as a micro shape is produced by MEMS technology. As shown in FIGS. 1 to 3, the variable capacity element 1 includes one pair of parallel plate type capacitor electrodes 11, 12 and pairs of parallel plate type driver electrodes 15a, 16a, 15b, 16b, 15c, 16c, 15d, 16d formed on a substrate 2. Driver electrodes 15a, 15b, 15c, 15d located upper side are connected with rims of the capacitor electrode 11 via connectors 17a, 17b, 17c, 17d. The connectors 17a, 17b, 17c, 17d are formed by an insulator so that driver electrodes 15a, 15b, 15c, 15d connected with the capacitor 11 in an insulated condition. The substrate 2 is, for example, made of silicon or quartz. The capacitor electrodes 11, 12 are formed by spattering or evaporating a metallic material with low electrical resistivity such as aluminum, copper or gold. The driver electrodes 15a to 15d and 16a to 16d are formed by spattering or evaporating a metallic material with low electrical resistivity such as aluminum, copper or gold. The capacitor electrodes 11 and 12 are formed in an area A1 of FIG. 2 and an area B1 of FIG. 3. The driver electrodes 15a, 16a, 15b, 16b are formed in a pair of areas B2 of FIG. 3.

The capacitor electrode 12 is formed in such a manner to be laminated on an insulating film 22 on the substrate 2, and is fixed up straight on the substrate. The capacitor electrode 11 is arranged with a gap space opposing to the capacitor electrode 12. As the capacitor electrode 11 is supported by the driver electrodes 15a, 15b, 15c and 15d from ends, it is maintained in such a state that can be moved vertically. The planar shape of the capacitor electrodes 11 and 12 are about rectangular shape. The upper limit of the short side of the rectangular shape depends on the value of mechanical strength of the sealing architecture of FIG. 4 and the long side of the rectangular shape depends on necessary electrical capacitance. As show in FIGS. 2 to 3, the surface of the capacitor electrode 12 is covered with an insulating film 21 so that it prevents electrical short to the capacitor electrode 11. Since FIG. 2 is a sectional view taken along a cutting plane A-A of FIG. 1 and the capacitor wrings 14c and 14d is connecter with capacitor electrode 12 electrically in the back of the cutting plane.

The driver electrodes 15a, 15b, 15c and 15d opposes to the paired driver electrode 16a, 16b, 16c and 16d with the gap space. The driver electrodes 16a to 16d are also covered with the insulating film 21 like the capacitor electrode 12 so that they prevent electrical short to the driver electrodes 15a to 15d. The pairs of driver electrodes 15a to 15d and 16a to 16d are formed on the insulating film 22. The driver electrode 15a is connected with one of the short sides of the capacitor electrode 11. The driver electrode 16a is connected with one of the short sides of the capacitor electrode 12. The driver electrode 15b is connected with the other short side of the capacitor electrode 11 opposed to the driver electrode 15a. The driver electrode 16b is connected with the other short side of the capacitor electrode 12 opposed to the driver electrode 16a. The driver electrode 15c is connected with one of the long sides of the capacitor electrode 11. The driver electrode 16c is connected with on of the long sides of the capacitor electrode 12. The driver electrode 15d is connected with the other long side of capacitor electrode 11 opposed to the driver electrode 15c. The driver electrode 16d is connected with the other long side of capacitor electrode 12 opposed to the driver electrode 16c.

Electrostatic capacitance of the variable capacity element is controlled by changing the distance D between the capacitor electrodes 11 and 12. The method of adjustment of the electrostatic capacitance of the variable capacity element is explained in detail. Electrostatic attractive force is generated by applying a potential difference or a voltage between driver electrodes 15a to 15d and 16a to 16d. The voltage is generated by applying prescribed voltages to a driver wiring 18 connected with the driver electrodes 15a to 15d and a driver wiring 19 connected with the driver electrodes 16a to 16d. Since FIG. 3 is a sectional view taken along a plane B-B of FIG. 1, the driver wiring 19 is connected with driver electrodes 16a and 16b electrically in the back of the cutting plane.

The upper driver electrodes 15a to 15d are pulled to the lower driver electrodes 16a to 16d by the electrostatic attractive force so that the upper driver electrodes 15a to 15d come down. As the upper driver electrodes 15a to 15d are connected with the capacitor electrode 11 via the connectors 17a to 17d mechanically, the capacitor electrode 11 comes down by coming down the capacitor electrodes 15a to 15d. The electrostatic capacitance of the variable capacity element is changed according to changing the distance D between the capacitor electrodes 11 and 12. As the zero voltage between the driver electrodes 15a to 15d and 16a to 16, the electrostatic attractive force between the driver electrodes 15a to 15d and 16a to 16 is zero so that the upper electrodes 15a to 15d return to original position. Therefore the capacitor electrode 11 returns to original position and the value of the capacitance of the variable capacity element 1 returns to original value.

Capacitor wirings 13a to 13d connected with external circuits are integrated with the capacitor electrode 11. Therefore capacitor wirings 13a to 13d are connected with the capacitor electrode 11 electrically. Capacitor wirings 14a to 14d connected with external circuits are integrated with the capacitor 12. Therefore capacitor wirings 14a to 14d are connected with the capacitor electrode 12 electrically. The capacitance generated by capacitor 11 and 12 supplies to external circuits via capacitor wirings 13a to 13d and 14a to 14d.

A pair of capacitor wirings 13a and 14a are connected with the capacitor electrodes 11 and 12 adjacently in the same direction. The capacitor wirings 13a and 14a extend parallel without overlapping from above. As shown in FIG. 3, the capacitor wirings 13a and 14a extend parallel from a lateral view. As the effective inductance is small, the distance between the capacitor wirings 13a and 14a is from several µ m to tens of µ m to have a little influence on the capacitance between capacitor electrodes 11 and 12. The capacitor wirings are formed multiple pairs. For example, the capacitor 13b and 14b are opposite to the capacitor wirings 13a and 14a. The capacitor wirings 13c and 14c are formed in the same side of the capacitor electrodes 11 and 12. The capacitor wirings 13d and 14d are opposite to the capacitor wirings 13c and 14c. There are four pairs of the capacitor wirings. The driver electrodes are formed multiple pairs. The pairs of the capacitor wirings 13a to 13d, 14a to 14d and the pairs of the driver electrodes 15a to 15d, 16a to 16d are formed alternately along the periphery of the capacitor electrodes 11 and 12. As the capacitor wirings and the diver electrodes are formed alternately along the periphery of the capacitor electrodes 11 and 12, it is preferable that the pairs are even pairs such as FIG. 1.

In this way the variable capacity element 1 according to the present invention has a pair of capacitor electrodes 11 and 12 which planar shape is about rectangular shape. A pair of the capacitor wirings are contacted with the capacitor electrodes 11 and 12 adjacently. The capacitor wirings extend parallel from the contact points from above.

Figure 4:
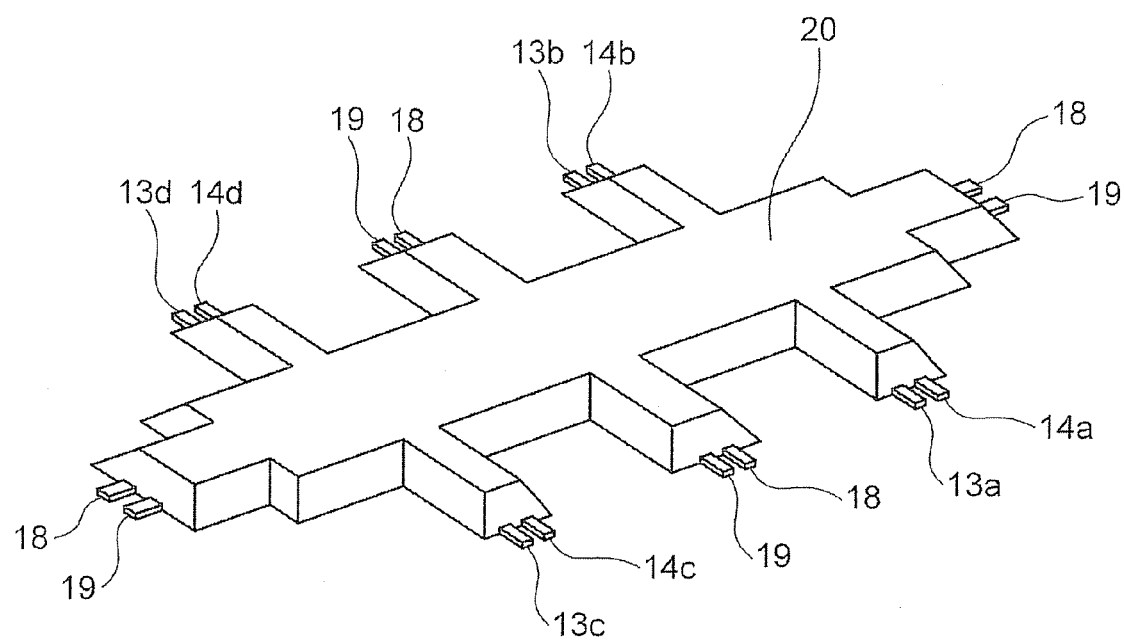
FIG. 4 is a outline view showing a sealing architecture of the variable capacity element to the present invention.

To keep the mobility of the variable capacity element 1, it has to be sealed hollow sealing architecture 20 such as FIG. 4. It is preferable that the sealing architecture is manufactured in a semiconductor wafer process if the variable capacity element 1 is manufactured in the process. For example, the sealing architecture 20 is formed by etching process after a thin insulated film is formed by CVD. The planar shape of the sealing architecture 20 is corresponded to the shape of the capacitor electrodes 11 and 12 which will be sealed and is about rectangular shape. It has convex portions which are corresponded to driver electrodes 15a to 15d and 16a to 16d to seal them connected with the capacitor electrodes 11 and 12.

The self-resonant frequency f is indicated by the following formula (1), $$f = 1/2/\pi/(LC)^{1/2} \tag{1}$$

where, C is the effective electrostatic capacitance and L is the effective inductance.

As shown in (1), in the case of the conventional structure of the variable capacity element, if the area of the capacitor electrode becomes large, the inductance of the capacitor has to be low to prevent the reduction of the self-resonant frequency. For example, if each side of the square shape of the capacitor electrode extends so that the effective capacitance is increased more than 10 pF, the effective inductance is reduced below 100 pF.

As shown in FIGS. 1 to 3, the capacitor electrodes 11 and 12 are enlarge to be about rectangular shape by extending one pair of the opposing sides of the square shape. Thus, the area of the capacitor electrodes 11 and 12 is enlarged to reach the requested capacity.

To prevent the reduction of the self-resonance frequency in this condition, the effective inductance must be reduced more than the case of conventional method. Pairs of capacitor wirings 13a to 13d and 14a to 14d connected with the capacitor electrode 11 are extended in parallel from the connecting portions. If a current which flows into the capacitor is flowed in the wiring 13a, a current which flows from the capacitor is flowed in the other wiring 14a. In this way if currents are flowed in the opposite direction in the pair of the wirings, the effective inductance Leff is indicated as follows:

$$\text{Leff} = L_{13a} + L_{14a} - 2M$$

Here $L_{13a}$ is a self inductance of the wiring 13a, $L_{14a}$ is a self inductance of the wiring 14a, and M is a mutual inductance of the wirings 13a and 14a. The larger the mutual inductance is, the smaller the effective inductance is. As the mutual inductance depends on a size of electromagnetic interaction between wirings, it is biggest in parallel wirings and is smallest in orthogonal wirings.

If pairs of capacitor wirings 13a to 13d and 14a to 14d extend parallel from the connecting portions from above, the effective inductance between the capacitor wirings 13a to 13d and 14a to 14d is smaller compared with conventional capacitor wirings at right angles to each other.

As the capacitor electrodes 11 and 12 are about rectangular shape, pairs of capacitor wirings 13a to 13d and 14a to 14d are formed in the long side. If the pairs of wirings are four, a current in the one pair of wiring is reduced to a quarter so that a current change rate is reduced to a quarter. Then the inductance seems to be reduced to a quarter. As the variable capacity element 1 has more pairs of capacitor wirings 13a to 13d and 14a to 14d than a conventional element, the effective, inductance can be reduced more. Although, electrostatics capacitance is generated in the capacitor wirings 13a to 13d and 14a to 14d, operation of the valuable capacity element 1 is not influenced by the electrostatic capacitance of the capacitor wirings because electrostatic capacitance of the capacitor electrodes is quite large.

Increase of the floating capacitance and effective inductance happens sometimes when the capacitor wiring is electrically contacted with a conductive material excluding the other pair of the capacitor wiring. The capacitor wirings 13a to 13d, 14a to 14d and the driver electrodes 15a to 15d, 16a to 16d are formed alternately along the periphery of the capacitor electrodes 11 and 12. As the capacitor electrodes 11 and 12 are seen from above, the driver electrodes 15a to 15d, 16a to 16d are connected with the capacitor electrodes 11 and 12 via connectors 17a to 17d made of an insulator. Therefore as the capacitor wirings 13a to 13d, 14a to 14d are not electrically contacted with a conductive material excluding the other pair of the capacitor wiring, unnecessary electrical junction is minimized so that increase of the floating capacitance and effective inductance is avoided.

In the conventional low capacitance type valuable capacity element, the effective inductance of the capacitor is gone up from hundreds of pF to several nH when the capacitance is about from hundreds of fF to several pF. In the valuable capacity element according to the embodiment, the capacitance is increased from tens of pF to hundreds of pf the effective by forming the long sides of the capacitor electrodes 11 and 12 with a size from tens of μ m to several mm, so that inductance of the capacitor is reduced from tens of pH to hundreds of pH.

The sealing architecture is formed by a thin insulating film. Near the center of the sealing architecture is easy to be changed shape by the external force. As the capacitor electrodes 11 and 12 is about rectangular shape, the area of them is large so that the planar shape of the sealing architecture is about rectangular shape with convex portions correspond to the driver electrodes and the capacitor wirings. In other words, when the sealing architecture 20 is seen from the upper position, the short side leaves the same size and only the long side is increased larger. Therefore comparing with the conventional square shape capacitor electrode being enlarged but keeping the square shape, the short sides of the sealing architecture 20 leaves the same size so that change of shape is not easy and small when an external force is applied. Consequently if the sealing architecture 20 is formed several μ m thin insulating film, mechanical strength can be obtained. Therefore the center of the sealing architecture do not bow and the capacitor electrode 11 is supported with a gap space so that the variable capacity element drives normally.

The capacitor wirings 13a to 13d, 14a to 14d and the driver electrodes 15a to 15d, 16a to 16d are formed even pairs. The capacitor wiring 13a to 13d, 14 a to 14d and the driver electrodes 15a to 15d, 16a to 16d are formed opposite each other via the capacitor electrodes 11 and 12. As the convex portions of the sealing architecture 20 are formed correspond to the capacitor wirings 13a to 13d, 14a to 14b and the driver electrodes 15a to 15d, 16a to 16d, the long and short sides of the sealing architecture 20 are supported by both sides so that mechanical strength can be obtained additionally.

As the variable capacity element 1 is seen from above, the capacitor wirings 13a to 13d connected with the capacitor electrode 11 and the capacitor wirings 14a to 14d connected with the capacitor electrode 12 are formed alternately. Therefore if the variable capacity element 1 are mounted in a semiconductor package, it is easy to perform a package design to arrange the external terminals of the package to be connected alternately with capacitor electrodes 11 and 12.

Figure 5:
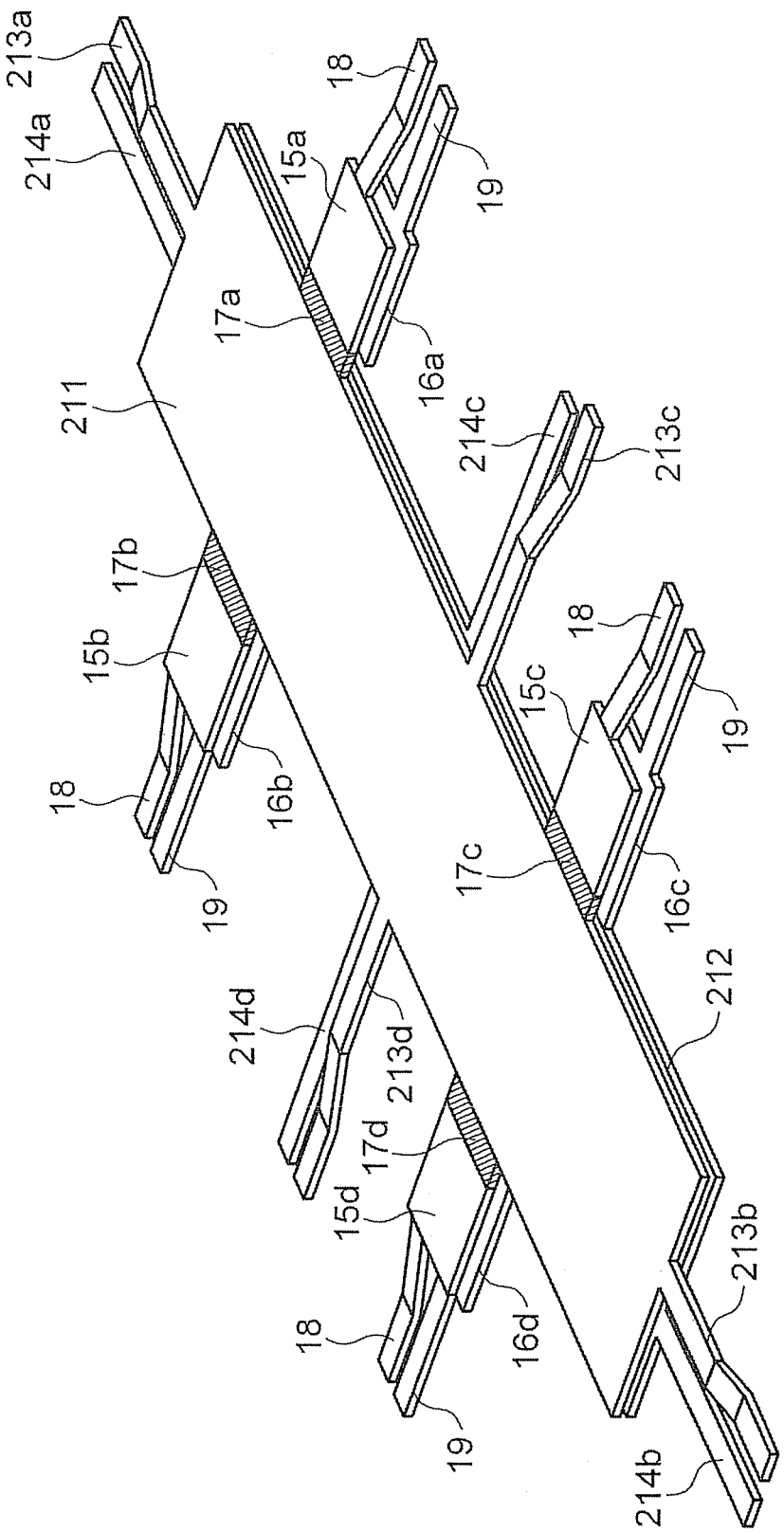
FIG. 5 is a perspective view showing a variable capacity element of a second embodiment.

As shown in FIG. 11, two pairs of the driver electrodes 15*a*, 16*a*, 15*b*, 16*b* are formed each short side of the capacitor electrodes 11 and 12. As shown in FIG. 5, two pairs of the capacitor wirings 213*a*, 214*a*, 213*b*, 214*b* formed each short side of the capacitor electrodes 211 and 212 is available. In this case, as shown in FIG. 5, two pairs of driver electrodes 15*a* to 15*d* and 16*a* to 16*d* are opposed in the long side of the capacitor electrode 211 and 212. Two pairs of the capacitor wirings 213*c*, 214*c*, 213*d*, 214*d* are formed between the driver electrodes 15*a* to 15*d* and 16*a* to 16*d*. In this way, the capacitor wirings and the driver electrodes are formed alternately along the periphery of the capacitor electrodes 211 and 212.

Other embodiments or modifications of the present invention will be apparent to those skilled in the art from consideration of the specification and practice of the invention disclosed herein. It is intended that the specification and example embodiments be considered as exemplary only, with a true scope and spirit of the invention being indicated by the following.

What is claimed is:

1. A variable capacity element comprising:
a substrate;
a pair of capacitor electrodes, each being planar in a rectangular shape substantially, one of capacitor electrodes being movable;
a pair of driver electrodes connected to the pair of capacitor electrodes, the driver electrodes being insulated with capacitor electrodes; and
multiple pairs of capacitor wirings extending in parallel each other from connecting portions with the pairs of the capacitor electrodes, each capacitor wiring being electrically connected with each capacitor electrode.

2. The variable capacity element according to claim 1, wherein the pair of the driver electrodes are formed more than two pairs.

3. The variable capacity element according to claim 1, wherein the capacitor electrodes and the driver electrodes are sealed with a thin film.

4. The variable capacity element according to claim 1, wherein the substrate is made of silicon or quartz.

5. The variable capacity element according to claim 1, wherein each capacitor electrode is at least one selected from a group consisting of aluminum, copper and gold.

6. The variable capacity element according to claim 1, wherein one of the capacitor electrodes is fixed with the substrate.

7. The variable capacity element according to claim 1, wherein an insulated film is formed on surfaces of the one of the capacitor electrodes and the one of the driver electrodes.

8. The variable capacity element according to claim 1, wherein a distance between two wirings which constitute each pair of the capacitor wirings is from several μm to tens of μm.

9. A variable capacity element comprising:
a substrate;
a pair of capacitor electrodes, each being planar in a rectangular shape substantially, one of capacitor electrodes being movable;
a pair of driver electrodes which is connected to a pair of capacitor electrodes, the driver electrodes being insulated with capacitor electrodes; and
multiple pairs of capacitor wirings extending in parallel each other from connecting portion with the pairs of the capacitor electrodes, each capacitor wiring being electrically connected with each capacitor electrode.

10. The variable capacity element according to claim 9, wherein the pair of the driver electrodes are formed more than two pairs.

11. The variable capacity element according to claim 9, wherein the capacitor electrodes and the driver electrodes are sealed with a thin film.

12. The variable capacity element according to claim 9, wherein the substrate is made of silicon or quartz.

13. The variable capacity element according to claim 8, wherein each capacitor electrode is at least one selected from a group consisting of aluminum, copper and gold.

14. The variable capacity element according to claim 9, wherein one of the capacitor electrodes is fixed with the substrate.

15. The variable capacity element according to claim 9, wherein an insulated film is formed on surfaces of the one of the capacitor electrodes and the one of the driver electrodes.

16. The variable capacity element according to claim 9, wherein a distance between two wirings which constitute each pair of the capacitor wirings is from several μm to tens of μm.

* * * * *